(12) United States Patent
Li et al.

(10) Patent No.: US 11,425,709 B2
(45) Date of Patent: Aug. 23, 2022

(54) DATA TRANSMISSION PROCESSING METHOD AND APPARATUS

(71) Applicant: Huawei Technologies Co., Ltd., Shenzhen (CN)

(72) Inventors: Yunbo Li, Shenzhen (CN); Jiayin Zhang, Shanghai (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 16/789,982

(22) Filed: Feb. 13, 2020

(65) Prior Publication Data

US 2020/0187183 A1 Jun. 11, 2020

Related U.S. Application Data

(63) Continuation of application No. 15/233,591, filed on Aug. 10, 2016, now Pat. No. 10,602,509, which is a continuation of application No. PCT/CN2014/071974, filed on Feb. 11, 2014.

(51) Int. Cl.
  *H04W 4/00* (2018.01)
  *H04W 72/04* (2009.01)
  *H04W 74/04* (2009.01)
  *H04W 84/12* (2009.01)

(52) U.S. Cl.
  CPC ......... *H04W 72/044* (2013.01); *H04W 74/04* (2013.01); *H04W 84/12* (2013.01)

(58) Field of Classification Search
  None
  See application file for complete search history.

(56) References Cited

U.S. PATENT DOCUMENTS

| 7,774,468 | B1 | 8/2010 | Nag et al. |
| 8,718,093 | B2 | 5/2014 | Zuniga et al. |
| 9,655,136 | B2 | 5/2017 | Yang et al. |
| 2006/0045048 | A1 | 3/2006 | Kwon et al. |
| 2006/0227733 | A1 | 10/2006 | Frederiks et al. |

(Continued)

FOREIGN PATENT DOCUMENTS

| AU | 2012265443 | 1/2014 |
| CN | 1419789 A | 5/2003 |

(Continued)

OTHER PUBLICATIONS

Deng, Jing, et al.; "The Head-of-Line Blocking Problem on Exposed Terminals in MANETs" 5 pages.

(Continued)

*Primary Examiner* — Zewdu A Beyen
(74) *Attorney, Agent, or Firm* — Slater Matsil, LLP

(57) ABSTRACT

Embodiments of the present invention provide a data transmission processing method and apparatus. The data transmission processing method in the embodiments includes successfully reserving, by a first station, a time-frequency resource, and allocating, by the first station, at least a partial time-frequency resource of the time-frequency resource to a third station, so that the third station performs data transmission on the allocated time-frequency resource, where the third station is a non-associated neighboring station of the first station.

20 Claims, 5 Drawing Sheets

A first station successfully reserves a time-frequency resource ~ 701

The first station allocates a remaining time-frequency resource to a third station, where the remaining time-frequency resource is a time-frequency resource that is not used when the first station allocates the time-frequency resource to an associated station of the first station ~ 702

(56) References Cited

U.S. PATENT DOCUMENTS

| | | | |
|---|---|---|---|
| 2007/0189205 A1* | 8/2007 | Terry | H04L 1/1812 370/328 |
| 2007/0195731 A1* | 8/2007 | Camp, Jr. | H04W 72/04 370/329 |
| 2007/0248117 A1 | 10/2007 | Zuniga et al. | |
| 2010/0322180 A1* | 12/2010 | Kim | H04W 72/1289 370/329 |
| 2011/0013601 A1 | 1/2011 | Cerasa et al. | |
| 2011/0064065 A1 | 3/2011 | Nakajima et al. | |
| 2011/0081865 A1* | 4/2011 | Xiao | H04W 72/1205 455/63.1 |
| 2011/0092209 A1* | 4/2011 | Gaal | H04W 36/16 455/436 |
| 2011/0310807 A1 | 12/2011 | Grandhi et al. | |
| 2012/0087355 A1 | 4/2012 | Wentink | |
| 2013/0089047 A1 | 4/2013 | Wentink | |
| 2014/0010211 A1 | 1/2014 | Asterjadhi et al. | |
| 2014/0086227 A1 | 3/2014 | Yang et al. | |
| 2015/0016411 A1 | 1/2015 | Xiao et al. | |
| 2015/0358958 A1 | 12/2015 | Terry et al. | |
| 2017/0188268 A1 | 6/2017 | Montemurro et al. | |

FOREIGN PATENT DOCUMENTS

| | | |
|---|---|---|
| CN | 1780458 A | 5/2006 |
| CN | 101385289 A | 3/2009 |
| CN | 101433022 A | 5/2009 |
| CN | 101527962 A | 9/2009 |
| CN | 102550106 A | 7/2012 |
| CN | 102843785 A | 12/2012 |
| CN | 103313407 A | 9/2013 |
| JP | 2006314034 A | 11/2006 |
| JP | 2006352711 A | 12/2006 |
| JP | 2008533933 A | 8/2008 |
| JP | 2009522930 A | 6/2009 |
| JP | 2009534994 A | 9/2009 |
| JP | 2013034070 A | 2/2013 |
| JP | 2013523000 A | 6/2013 |
| WO | 0172061 A1 | 9/2001 |
| WO | 2007089797 A3 | 1/2008 |
| WO | 2012163157 | 12/2012 |

OTHER PUBLICATIONS

Electronics and Telecommunications Research Institute (ETRI), "Technologies for Beyond LTE-Advanced (3GPP Rel-10)," Jun. 26, 2012, 32 pages.
Gao, L. et al., "Heterogeneous Networks Theory and Standardization in LTE," Tutorial Presentation, IEEE WCNC 2013, 113 pages.
Mittal, Kimaya, et al.; "RTSS/CTSS: Mitigation of Exposed Terminals in Static 802.11-Based Mesh Networks" Department of Computer Science; University of Califormia, Santa Barbara; 10 pages.
Nakamura, T. et al., "Trends in Small Cell Enhancements in LTE Advanced," IEEE Communications Magazine, vol. 51, Issue 2, Feb. 14, 2013, pp. 98-105.
Shigeyasu, Tetsuya, et al.; "A Method for Synchronous Transmissions with Exposing Terminal on the Basis of Overhearing RTS Header Information"; 2009 International Conference on Network-Based Information Systems; pp. 560-563.
Shukla, Deepanshu et al.; "Mitigating the Exposed Node Problem in IEEE 802.11 Ad Hoc Networks"; K. R. School of Information Technology, Indian Institue of Technology Bombay; Powai, Mumbai—400 076; pp. 157-162.

* cited by examiner

DATA TRANSMISSION PROCESSING METHOD AND APPARATUS

CROSS-REFERENCE TO RELATED APPLICATIONS

This application is a continuation of U.S. patent application Ser. No. 15/233,591, filed on Aug. 10, 2016, which is a continuation of International Patent Application No. PCT/CN2014/071974, filed on Feb. 11, 2014. All of the aforementioned patent applications are incorporated herein by reference in their entireties.

TECHNICAL FIELD

Embodiments of the present invention relate to communications technologies, and in particular, to a data transmission processing method and apparatus.

BACKGROUND

Carrier sense and channel reservation mechanisms are used in a wireless local area network (WLAN) system. After a period of time on a channel is reserved by a station, another station is not allowed to perform data sending during the period of time. In the prior art, when an access point (AP) successfully reserves a time-frequency resource, only the access point can use the time-frequency resource, and a non-associated neighboring station of the AP does not perform data sending on the time-frequency resource. Therefore, there is a problem of low efficiency in transmitting data in the prior art.

SUMMARY

Embodiments provide a data transmission processing method and apparatus, so as to improve system transmission efficiency.

According to a first aspect, an embodiment provides a data transmission processing method, including successfully reserving, by a first station, a time-frequency resource. The method also includes allocating, by the first station, at least a partial time-frequency resource of the time-frequency resource to a third station, so that the third station performs data transmission on the allocated time-frequency resource, where the third station is a non-associated neighboring station of the first station.

With reference to the first aspect, in a first possible implementation manner of the first aspect, the allocating, by the first station, at least a partial time-frequency resource of the time-frequency resource to a third station includes: allocating, by the first station to the third station, a time-frequency resource occupied for data transmission between the first station and a second station, where the second station is an associated station of the first station, and the third station is not a neighboring station of the second station; or allocating, by the first station, a remaining time-frequency resource to the third station, where the remaining time-frequency resource is a time-frequency resource that is not used when the first station allocates the time-frequency resource to an associated station of the first station.

With reference to the first possible implementation manner of the first aspect, in a second possible implementation manner of the first aspect, the allocating, by the first station to the third station, a time-frequency resource occupied for data transmission between the first station and a second station includes: sending, by the first station, scheduling signaling to the third station, where the scheduling signaling includes information indicating that the third station can send data on the time-frequency resource occupied for sending, by the first station, data to the second station; or sending, by the first station, scheduling signaling to the third station, where the scheduling signaling includes information indicating that an associated station of the third station can send data on a time-frequency resource occupied for receiving, by the first station, data sent by the second station, and the associated station of the third station is not a neighboring station of the first station.

With reference to the first possible implementation manner of the first aspect, in a third possible implementation manner of the first aspect, the allocating, by the first station, a remaining time-frequency resource to the third station includes: sending, by the first station, scheduling signaling to the third station, where the scheduling signaling includes information indicating that the third station can perform data transmission on the remaining time-frequency resource.

With reference to the second or third possible implementation manner of the first aspect, in a fourth possible implementation manner of the first aspect, the sending, by the first station, scheduling signaling to the third station includes: sending, by the first station, the scheduling signaling to the third station by using multiple scheduling signaling sending periods set in a downlink period.

With reference to the first aspect or any one of the first to fourth possible implementation manners of the first aspect, in a fifth possible implementation manner of the first aspect, before the allocating, by the first station, at least a partial time-frequency resource of the time-frequency resource to a third station, the method further includes: establishing, by the first station, a neighbor list, where the neighbor list includes a neighboring station of the first station.

With reference to the second possible implementation manner of the first aspect, in a sixth possible implementation manner of the first aspect, before the allocating, by the first station to the third station, a time-frequency resource occupied for data transmission between the first station and a second station, the method further includes: acquiring, by the first station, a neighbor list of the second station, where the neighbor list includes a neighboring station of the second station.

According to a second aspect, an embodiment provides a data transmission processing method, including acquiring, by a third station, a time-frequency resource allocated by a first station to the third station, where the allocated time-frequency resource is at least a partial time-frequency resource of a time-frequency resource reserved by the first station, and the third station is a non-associated neighboring station of the first station. The method also includes performing, by the third station, data transmission on the allocated time-frequency resource.

With reference to the second aspect, in a first possible implementation manner of the second aspect, that the allocated time-frequency resource is at least a partial time-frequency resource of a time-frequency resource reserved by the first station includes: the allocated time-frequency resource is a time-frequency resource occupied for data transmission between the first station and a second station, where the second station is an associated station of the first station, and the third station is not a neighboring station of the second station; or the allocated time-frequency resource is a remaining time-frequency resource, where the remaining time-frequency resource is a time-frequency resource that is not used when the first station allocates the time-frequency resource to an associated station of the first station.

With reference to the first possible implementation manner of the second aspect, in a second possible implementation manner of the second aspect, the acquiring, by a third station, a time-frequency resource allocated by a first station to the third station, where the allocated time-frequency resource is a time-frequency resource occupied for data transmission between the first station and a second station includes: receiving, by the third station, scheduling signaling sent by the first station, where the scheduling signaling includes information indicating that the third station can send data on the time-frequency resource occupied for sending, by the first station, data to the second station; or receiving, by the third station, scheduling signaling sent by the first station, where the scheduling signaling includes information indicating that an associated station of the third station can send data on a time-frequency resource occupied for receiving, by the first station, data sent by the second station, and the associated station of the third station is not a neighboring station of the first station.

With reference to the first possible implementation manner of the second aspect, in a third possible implementation manner of the second aspect, the acquiring, by a third station, a time-frequency resource allocated by a first station to the third station, where the allocated time-frequency resource is a remaining time-frequency resource includes: receiving, by the third station, scheduling signaling sent by the first station, where the scheduling signaling includes information indicating that the third station can perform data transmission on the remaining time-frequency resource.

With reference to the second or third possible implementation manner of the second aspect, in a fourth possible implementation manner of the second aspect, the receiving, by the third station, scheduling signaling sent by the first station includes: receiving, by the third station, the scheduling signaling that is sent by the first station by using multiple scheduling signaling sending periods set in a downlink period.

With reference to any one of the second to fourth possible implementation manners of the second aspect, in a fifth possible implementation manner of the second aspect, if the third station is a neighboring station of the first station in a scenario in which two access points (APs) are not neighboring stations, where the first station is either one of the two APs, after the receiving, by the third station, scheduling signaling sent by the first station, the method further includes: notifying, by the third station, the associated station of the third station of indication information in the scheduling signaling; and receiving, by the third station, scheduling performed by the associated station of the third station.

With reference to the fifth possible implementation manner of the second aspect, in a sixth possible implementation manner of the second aspect, the receiving, by the third station, scheduling performed by the associated station of the third station includes: receiving, by the third station by using the multiple scheduling signaling sending periods set in the downlink period, the scheduling performed by the associated station of the third station.

According to a third aspect, an embodiment provides a station, where the station is a first station, and the station includes: a reservation module, configured to successfully reserve a time-frequency resource; and an allocation module, configured to allocate at least a partial time-frequency resource of the time-frequency resource to a third station, so that the third station performs data transmission on the allocated time-frequency resource, where the third station is a non-associated neighboring station of the first station.

With reference to the third aspect, in a first possible implementation manner of the third aspect, the allocation module includes: a first allocation unit, configured to allocate, to the third station, a time-frequency resource occupied for data transmission between the first station and a second station, where the second station is an associated station of the first station, and the third station is not a neighboring station of the second station; or a second allocation unit, configured to allocate a remaining time-frequency resource to the third station, where the remaining time-frequency resource is a time-frequency resource that is not used when the first station allocates the time-frequency resource to an associated station of the first station.

With reference to the first possible implementation manner of the third aspect, in a second possible implementation manner of the third aspect, the first allocation unit is specifically configured to: send scheduling signaling to the third station, where the scheduling signaling includes information indicating that the third station can send data on the time-frequency resource occupied for sending, by the first station, data to the second station; or send scheduling signaling to the third station, where the scheduling signaling includes information indicating that an associated station of the third station can send data on a time-frequency resource occupied for receiving, by the first station, data sent by the second station, and the associated station of the third station is not a neighboring station of the first station.

With reference to the first possible implementation manner of the third aspect, in a third possible implementation manner of the third aspect, the second allocation unit is specifically configured to send scheduling signaling to the third station, where the scheduling signaling includes information indicating that the third station can perform data transmission on the remaining time-frequency resource.

With reference to the second or third possible implementation manner of the third aspect, in a fourth possible implementation manner of the third aspect, the allocation module is specifically configured to send the scheduling signaling to the third station by using multiple scheduling signaling sending periods set in a downlink period.

With reference to the third aspect or any one of the first to fourth possible implementation manners of the third aspect, in a fifth possible implementation manner of the third aspect, the station further includes: an establishment module, configured to establish a neighbor list, where the neighbor list includes a neighboring station of the first station.

With reference to the second possible implementation manner of the third aspect, in a sixth possible implementation manner of the third aspect, the station further includes: an acquiring module, configured to acquire a neighbor list of the second station, where the neighbor list includes a neighboring station of the second station.

According to a fourth aspect, an embodiment provides a station, where the station is a third station, and the station includes: an acquiring module, configured to acquire a time-frequency resource allocated by a first station to the third station, where the allocated time-frequency resource is at least a partial time-frequency resource of a time-frequency resource reserved by the first station, and the third station is a non-associated neighboring station of the first station; and a transmission module, configured to perform data transmission on the allocated time-frequency resource.

With reference to the fourth aspect, in a first possible implementation manner of the fourth aspect, that the allocated time-frequency resource is at least a partial time-frequency resource of a time-frequency resource reserved by the first station includes: the allocated time-frequency resource is a time-frequency resource occupied for data transmission between the first station and a second station, where the second station is an associated station of the first station, and the third station is not a neighboring station of the second station; or the allocated time-frequency resource is a remaining time-frequency resource, where the remaining time-frequency resource is a time-frequency resource that is not used when the first station allocates the time-frequency resource to an associated station of the first station.

With reference to the first possible implementation manner of the fourth aspect, in a second possible implementation manner of the fourth aspect, when the allocated time-frequency resource is the time-frequency resource occupied for data transmission between the first station and the second station, the acquiring module is specifically configured to: receive scheduling signaling sent by the first station, where the scheduling signaling includes information indicating that the third station can send data on the time-frequency resource occupied for sending, by the first station, data to the second station; or receive scheduling signaling sent by the first station, where the scheduling signaling includes information indicating that an associated station of the third station can send data on a time-frequency resource occupied for receiving, by the first station, data sent by the second station, and the associated station of the third station is not a neighboring station of the first station.

With reference to the first possible implementation manner of the fourth aspect, in a third possible implementation manner of the fourth aspect, when the allocated time-frequency resource is the remaining time-frequency resource, the acquiring module is specifically configured to receive scheduling signaling sent by the first station, where the scheduling signaling includes information indicating that the third station can perform data transmission on the remaining time-frequency resource.

With reference to the second or third possible implementation manner of the fourth aspect, in a fourth possible implementation manner of the fourth aspect, the acquiring module is specifically configured to receive the scheduling signaling that is sent by the first station by using multiple scheduling signaling sending periods set in a downlink period.

With reference to any one of the second to fourth possible implementation manners of the fourth aspect, in a fifth possible implementation manner of the fourth aspect, if the third station is a neighboring station of the first station in a scenario in which two APs are not neighboring stations, where the first station is either one of the two APs, the third station further includes: a notification module, configured to notify the associated station of the third station of indication information in the scheduling signaling; and a receiving module, configured to receive scheduling performed by the associated station of the third station.

With reference to the fifth possible implementation manner of the fourth aspect, in a sixth possible implementation manner of the fourth aspect, the receiving module is specifically configured to receive, by using the multiple scheduling signaling sending periods set in the downlink period, the scheduling performed by the associated station of the third station.

In an embodiment, a first station successfully reserves a time-frequency resource, and allocates at least a partial time-frequency resource of the time-frequency resource to a third station, so that the third station performs data transmission on the allocated time-frequency resource, where the third station is a non-associated neighboring station of the first station, and the third station can share, with the first station, the time-frequency resource reserved by the first station. Therefore, system transmission efficiency is improved.

BRIEF DESCRIPTION OF THE DRAWINGS

To describe the technical solutions in the embodiments or in the prior art more clearly, the following briefly describes the accompanying drawings required for describing the embodiments or the prior art. Apparently, the accompanying drawings in the following description show some embodiments, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope.

Figure 1:
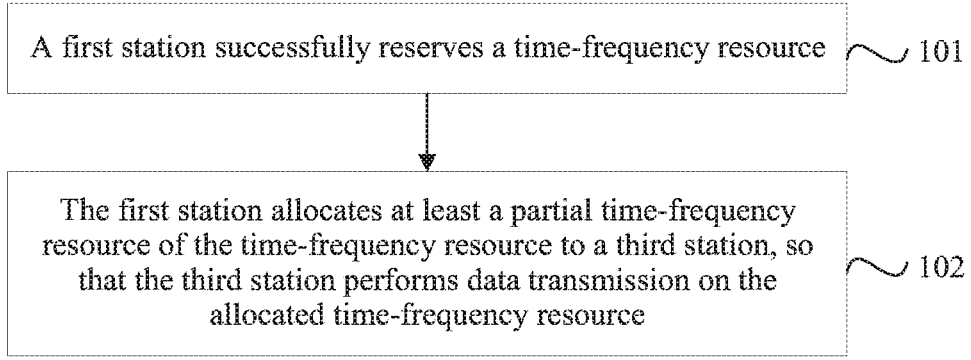
FIG. 1 is a schematic flowchart of Embodiment 1 of a data transmission processing method according to embodiments.

FIG. 1 is a schematic flowchart of Embodiment 1 of a data transmission processing method according embodiments. As shown in FIG. 1, the method in this embodiment may include the following steps.

Step 101: A first station successfully reserves a time-frequency resource.

Step 102: The first station allocates at least a partial time-frequency resource of the time-frequency resource to a third station, so that the third station performs data transmission on the allocated time-frequency resource, where the third station is a non-associated neighboring station of the first station.

The solutions proposed in embodiments are performing primary link resource multiplexing based on a scheduling mechanism, where the scheduling mechanism refers to that all uplink and downlink resources in a basic service set (BSS) are scheduled by an access point (AP) and a station (STA) sends and receives data on a scheduled time-frequency resource.

In this embodiment, a first station successfully reserves a time-frequency resource by contending for a channel, where the first station may be an AP. A specific process of contending for the channel and reserving the time-frequency resource is not concerned by this patent, and may use a mechanism in an existing standard, or may use another mechanism. For example, the first station first senses a channel, and after idleness of the channel reaches distributed coordination function interframe space (DIFS), one backoff random number is generated. If the channel is idle until the backoff random number is counted down to zero, the first station sends a clear to send to self (CTS-to-self) frame to reserve a channel, where the CTS-to-self frame includes a duration field for duration for reserving the channel. After receiving the CTS-to-self frame, another station does not perform active sending on the channel within a time indicated by the Duration field.

According to an existing wireless local area access network (WLAN) standard, an AP that successfully reserves a time-frequency resource (that is, successfully obtains a channel by means of contention) exclusively uses the time-frequency resource reserved by the AP, that is, the AP can schedule the AP itself and an associated STA of the AP on the time-frequency resource. In comparison, in this embodiment, at the same time when the first station that successfully obtains the channel by means of contention schedules the first station itself and an associated station of the first station on the time-frequency resource, the first station further allocates at least a partial time-frequency resource of the time-frequency resource to a third station, so that the third station performs data transmission on the allocated time-frequency resource, where the third station is a non-associated neighboring station of the first station. Optionally, the at least a partial time-frequency resource may be a time-frequency resource occupied for data transmission between the first station and a second station (where the second station is an associated station of the first station, and the third station is not a neighboring station of the second station), or may be a time-frequency resource (a remaining time-frequency resource) that is not used when the first station allocates the reserved time-frequency resource to an associated station of the first station. A neighboring station of the first station refers to a station that can properly receive data sent by the first station. The neighboring station may be either an AP or a STA other than an access point, and includes both an associated station of the first station and a non-associated station of the first station. Because of a protocol requirement and a security consideration, an access point can perform data communication only with an associated station of the access point, but cannot perform data communication with a non-associated station of the access point, and only interaction of specific signaling is allowed (for example, in an embodiment, the first station sends scheduling signaling to the third station); a station other than an access point can perform data communication only with an associated station of the station, but cannot perform data communication with a non-associated station of the station other than the access point, and only interaction of specific signaling is allowed.

In this embodiment, a first station successfully reserves a time-frequency resource, and allocates at least a partial time-frequency resource of the time-frequency resource to a third station, so that the third station performs data transmission on the allocated time-frequency resource, where the third station is a non-associated neighboring station of the first station, and the third station can share, with the first station, the time-frequency resource reserved by the first station. Therefore, system transmission efficiency is improved.

Figure 2:
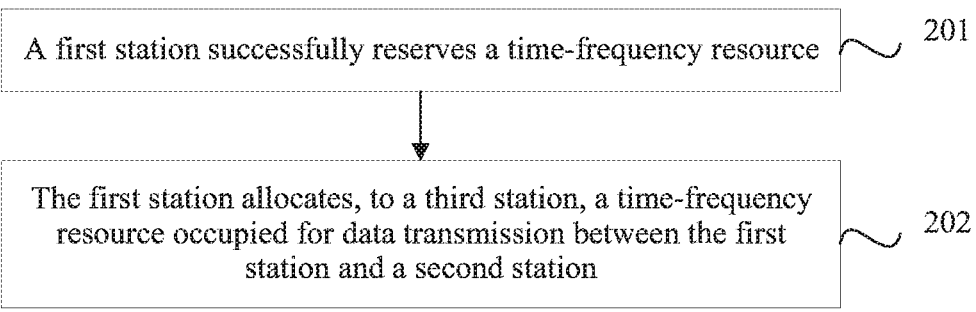
FIG. 2 is a schematic flowchart of Embodiment 2 of a data transmission processing method according to embodiments.

FIG. 2 is a schematic flowchart of Embodiment 2 of a data transmission processing method according to embodiments. As shown in FIG. 2, the method in this embodiment may include the following steps.

Step 201: A first station successfully reserves a time-frequency resource.

Step 202: The first station allocates, to a third station, a time-frequency resource occupied for data transmission between the first station and a second station, where the second station is an associated station of the first station, and the third station is not a neighboring station of the second station.

Optionally, the allocating, by the first station to the third station, a time-frequency resource occupied for data transmission between the first station and a second station includes: sending, by the first station, scheduling signaling to the third station, where the scheduling signaling includes information indicating that the third station can send data on the time-frequency resource occupied for sending, by the first station, data to the second station; or sending, by the first station, scheduling signaling to the third station, where the scheduling signaling includes information indicating that an associated station of the third station can send data on a time-frequency resource occupied for receiving, by the first station, data sent by the second station, and the associated station of the third station is not a neighboring station of the first station.

In this embodiment, the second station is the associated station of the first station, the third station is a non-associated neighboring station of the first station, and the third station is not the neighboring station of the second station, that is, the third station and the second station cannot sense each other; therefore, the third station is an exposed station of a link between the first station and the second station.

In this embodiment, the data transmission between the first station and the second station includes two implementable manners, where a first implementable manner is that the first station performs downlink sending, and a second implementable manner is that the second station performs uplink sending.

When the first station performs downlink sending (that is, in a downlink period), the first station may allocate, to the third station by sending the scheduling signaling to the third station, the time-frequency resource occupied for the data transmission between the first station and the second station, where the scheduling signaling includes the information indicating that the third station can send data on the time-frequency resource occupied for sending, by the first station, data to the second station.

In this embodiment, a scenario in which two APs are neighboring stations and a scenario in which two APs are not neighboring stations (that is, two BSSs have an overlapped area, but either AP of the two APs is not within coverage of the other AP) are included. In the scenario in which the two APs are neighboring stations, the first station may be correspondingly a first AP, and the third station may be correspondingly a non-associated neighboring AP of the first AP.

In the scenario in which the two APs are not neighboring stations, the third station may be correspondingly a non-associated STA of the first AP.

Figure 3:
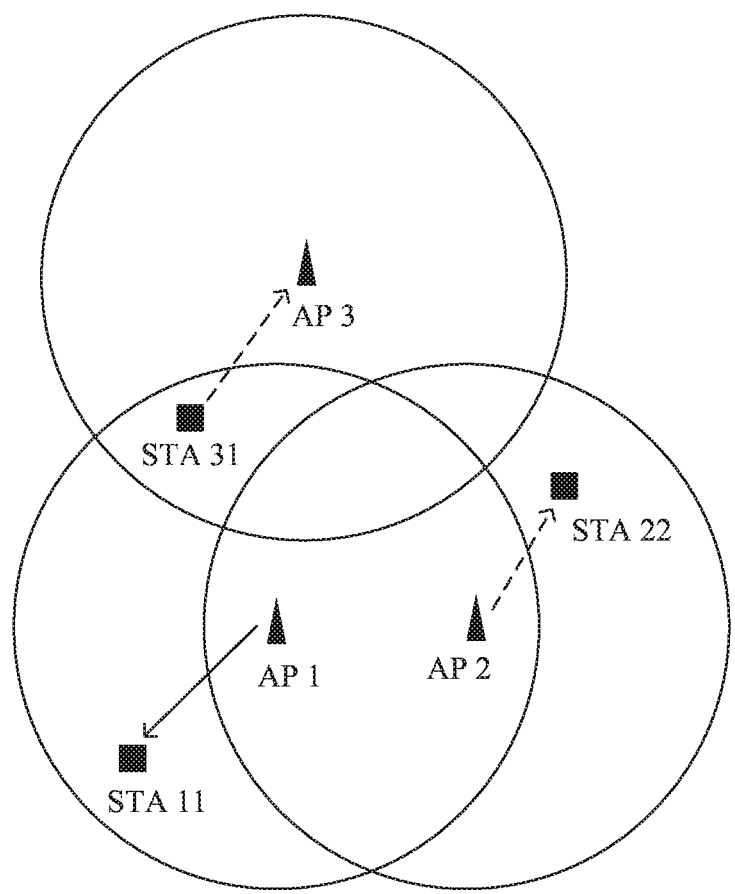
FIG. 3 is a schematic diagram 1 of station communication according to embodiments.

FIG. 3 is a schematic diagram 1 of station communication according to embodiments. As shown in FIG. 3, when the two APs are neighboring stations, the first AP is correspondingly an AP 1 (the first station), the neighboring AP is correspondingly an AP 2 (the third station), and the second station is correspondingly a STA 11, where the STA 11 is out of coverage of the AP 2 (that is, the third station is not the neighboring station of the second station). In this embodiment, the AP 1 may allocate, to the AP 2 for downlink sending, a time-frequency resource occupied for sending data to the STA 11. Optionally, the AP 1 may send scheduling signaling to the AP 2, where the scheduling signaling includes information indicating that the AP 2 can send data on a time-frequency resource occupied for sending, by the AP 1, data to the STA 11. Optionally, the AP 2 can send data to a STA 22 on the time-frequency resource allocated by the AP 1. Further, in order that a process in which the AP 2 sends data to the STA 22 does not affect sending, by the AP 1, data to the STA 11, preferably, the STA 11 and the STA 22 cannot sense each other. In this embodiment, a resource allocation principle 1 is summarized according to the foregoing description. As shown in Table 1, in a downlink period, if a location of the second station is outside an overlapped area between a BSS to which the first station belongs and a BSS to which the third station belongs, the first station may allocate, to the third station for downlink sending, a time-frequency resource occupied for sending data to the second station. If the location of the second station is within the overlapped area, the first station cannot allocate, to the third station, the time-frequency resource occupied for sending data to the second station. Optionally, the scheduling signaling sent by the first station to the third station may be transmitted through an air interface, which is equivalent to that the first station uses the neighboring AP (the third station) as a STA of the BSS to which the first station belongs, to perform resource scheduling. However, it should be emphasized herein that data communication is not directly performed between the first station and the third station.

TABLE 1

Resource allocation principle 1

| | Location of a second station | Allocation policy |
|---|---|---|
| Downlink | Outside an overlapped area | Downlink is available for a third station. |
| | Within an overlapped area | Allocation is not allowed. |

As shown in FIG. 3, when the two APs are not neighboring stations, the first AP is correspondingly an AP 1 (the first station), a non-associated STA of the first AP is correspondingly a STA 31 (the third station), and the second station is correspondingly a STA 11, where the STA 11 is out of coverage of the STA 31 (that is, the third station is not the neighboring station of the second station). In this embodiment, the AP 1 may allocate, to the STA 31 for uplink sending, a time-frequency resource occupied for sending data to the STA 11. Optionally, the AP 1 may send scheduling signaling to the STA 31, where the scheduling signaling includes information indicating that the STA 31 can send data on a time-frequency resource occupied for sending, by the AP 1, data to the STA 11. Further, the STA 31 notifies an AP 3 of the indication information, so that the AP 3 schedules the STA 31 according to information that is sent by the STA 31 and indicates that a time-frequency resource can be shared. Therefore, the STA 31 can send data to the AP 3 on the time-frequency resource allocated by the AP 1. Optionally, a manner in which the STA 31 notifies the associated AP 3 of the scheduling indication information may be reporting by using a common uplink time-frequency resource, or may be another manner, which is not limited herein in this embodiment.

When the second station performs uplink sending (that is, in an uplink period), the first station may allocate, to the third station by sending the scheduling signaling to the third station, the time-frequency resource occupied for the data transmission between the first station and the second station, where the scheduling signaling includes the information indicating that an associated station of the third station can send data on a time-frequency resource occupied for receiving, by the first station, data sent by the second station, and the associated station of the third station is not the neighboring station of the first station. In this embodiment, the third station can directly perform data communication with the associated station of the third station.

In this embodiment, a scenario in which two APs are neighboring stations and a scenario in which two APs are not neighboring stations (that is, two BSSs have an overlapped area, but either AP of the two APs is not within coverage of the other AP) are included. In the scenario in which the two APs are neighboring stations, the first station may be correspondingly a first AP, the third station may be correspondingly a non-associated neighboring AP of the first AP, and the associated station of the third station may be correspondingly an associated STA of the neighboring AP. In the scenario in which the two APs are not neighboring stations, the third station may be correspondingly a non-associated STA of the first AP, and the associated station of the third station may be correspondingly an associated AP of the non-associated STA.

Figure 4:
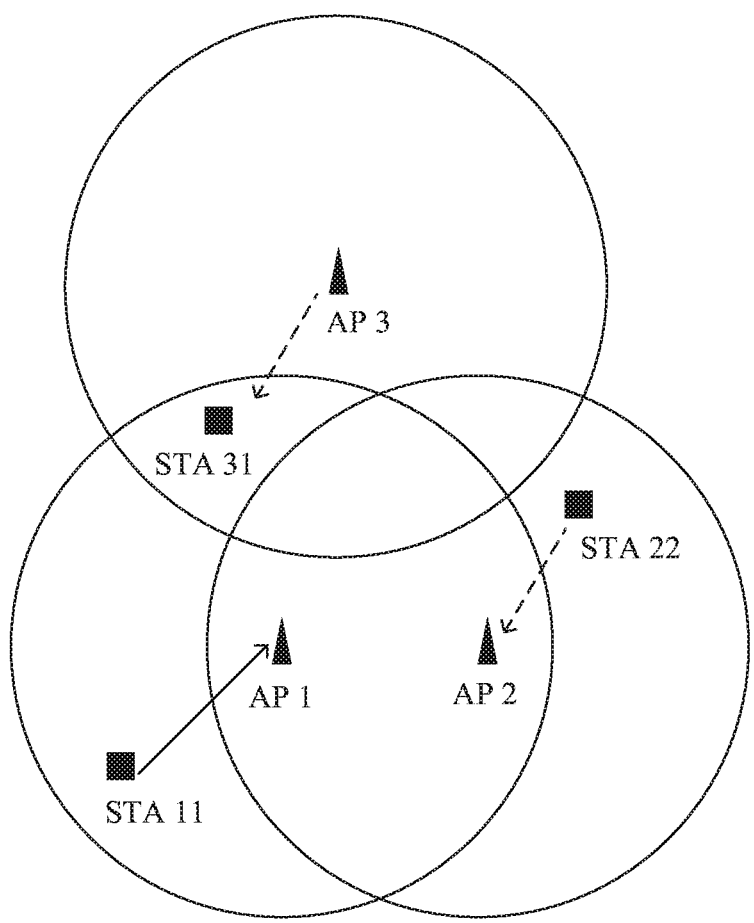
FIG. 4 is a schematic diagram 2 of station communication according to embodiments.

FIG. 4 is a schematic diagram 2 of station communication according to an embodiment. As shown in FIG. 4, when the two APs are neighboring stations, the first AP is correspondingly an AP 1 (the first station), the neighboring AP is correspondingly an AP 2 (the third station), the associated STA of the neighboring AP is correspondingly a STA 22, and the second station is correspondingly a STA 11, where the STA 11 is out of coverage of the AP 2 (that is, the third station is not the neighboring station of the second station); the STA 22 is not within coverage of the AP 1 (that is, the associated station of the third station is not a neighboring station of the first station). In this embodiment, the AP 1 may allocate, to the STA 22 for uplink sending, a time-frequency resource occupied for sending, by the STA 11, data to the AP 1 (that is, the AP 2 receives data sent by the STA 22). Optionally, the AP 1 may send scheduling signaling to the AP 2, where the scheduling signaling includes information indicating that an associated station of the AP 2 can send data on a time-frequency resource occupied for receiving, by the AP 1, data sent by the STA 11, where the associated station of the AP 2 is not a neighboring station of the AP 1. Further, the AP 2 may schedule the STA 22 to send data on the time-frequency resource allocated by the AP 1. Because the STA 22 is not within the coverage of the AP 1, a process in which the STA 22 sends data to the AP 2 does not affect receiving, by the AP 1, data sent by the STA 11. In this embodiment, a resource allocation principle 2 is summarized according to the foregoing description. As shown in Table 2, in an uplink period, if a location of the second station is outside an overlapped area between a BSS to which the first station belongs and a BSS to which the third station belongs, the first station may allocate, to the associated station of the third station for uplink sending, a time-frequency resource occupied for receiving data sent by the second station, and the associated station of the third station is not within the overlapped area. If the location of the second station is within the overlapped area, the first station cannot allocate, to the associated station of the third station, the time-frequency resource occupied for receiving data sent by the second station. Optionally, the scheduling signaling sent by the first station to the third station may be transmitted through an air interface, which is equivalent to that the first station uses the neighboring AP (the third station) as a STA of the BSS to which the first station belongs, to perform resource scheduling. However, it should be emphasized herein that data communication is not directly performed between the first station and the third station.

TABLE 2

Resource allocation principle 2

| Location of a second station | Allocation policy |
|---|---|
| Uplink Outside an overlapped area | Uplink is available for an associated station of a third station, where the associated station is not within an overlapped area. |
| Within an overlapped area | Allocation is not allowed. |

As shown in FIG. 4, when the two APs are not neighboring stations, the first AP is correspondingly an AP 1 (the first station), a non-associated STA of the first AP is correspondingly a STA 31 (the third station), the associated station of the third station is correspondingly an AP 3, and the second station is correspondingly to a STA 11, where the STA 11 is out of coverage of the STA 31 (that is, the third station is not a neighboring station of the second station); the AP 3 is not within coverage of the AP 1 (that is, the associated station of the third station is not a neighboring station of the first station). In this embodiment, the AP 1 may allocate, to the AP 3 for downlink sending, a time-frequency resource occupied for sending, by the STA 11, data to the AP 1 (that is, the STA 31 may receive data sent by the AP 3). Optionally, the AP 1 may send scheduling signaling to the STA 31, where the scheduling signaling information indicating that the associated station AP 3 of the STA 31 can send data on a time-frequency resource occupied for receiving, by the AP 1, data sent by the STA 11 (that is, the STA 31 may receive data sent by the AP 3), where the associated station of the third station is not a neighboring station of the AP 1. Further, the STA 31 notifies the AP 3 of the scheduling indication information, so that the AP 3 schedules the associated STA of the AP 3, such as the STA 31, according to information that is sent by the STA 31 and indicates that a time-frequency resource can be shared. Optionally, a manner in which the STA 31 notifies the associated AP 3 of the indication information may be reporting by using a common uplink time-frequency resource, or may be another manner, which is not limited herein in this embodiment.

Figure 5:
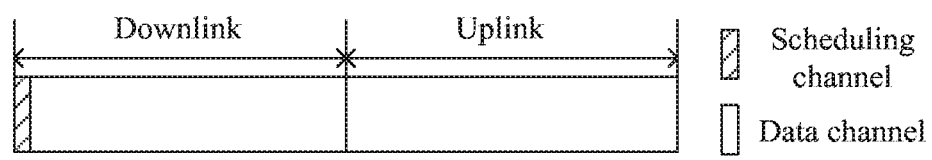
FIG. 5 is a schematic setting diagram 1 of a scheduling channel.
Figure 6:
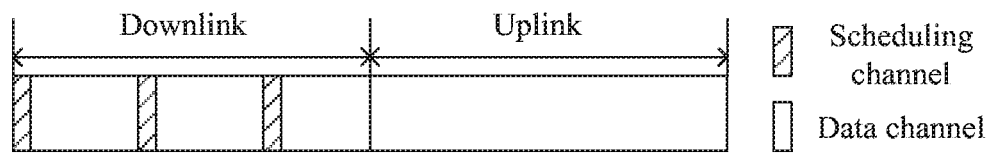
FIG. 6 is a schematic setting diagram 2 of a scheduling channel.

FIG. 5 is a schematic setting diagram 1 of a scheduling channel. As shown in FIG. 5, in an existing scheduling mechanism, scheduling of downlink and uplink periods is generally performed at a beginning part of a downlink period. However, in a scenario in which two APs are neighboring stations in this embodiment, after a first station allocates a sharable resource to a third station according to a setting manner of a scheduling channel in the existing scheduling mechanism, a scheduling time already ends. As a result, the third station may have no chance to allocate an obtained shared resource to a STA of a BSS to which the third station belongs. Therefore, it may be learned, according to the description in the foregoing embodiments, that multiple scheduling signaling sending chances are needed in this embodiment. FIG. 6 is a schematic setting diagram 2 of a scheduling channel. As shown in FIG. 6, multiple scheduling signaling sending periods (corresponding to scheduling channels in FIG. 6) are set in a downlink period in this embodiment; if an AP has performed scheduling in a scheduling signaling period, a subsequent scheduling period can be used for data transmission; if an AP has missed a scheduling signaling period, the AP may still perform scheduling in a next scheduling signaling period.

Optionally, as shown in FIG. 6, the first station may send the scheduling signaling to the third station by using multiple scheduling signaling sending periods set in a downlink period.

Optionally, in this embodiment, an AP may also perform scheduling in any downlink period, but such a scheduling manner requires all stations to maintain a sensing state in a downlink period until scheduling signaling is received.

Optionally, before the allocating, by the first station, at least a partial time-frequency resource of the time-frequency resource to a third station, the method further includes: establishing, by the first station, a neighbor list, where the neighbor list includes a neighboring station of the first station.

In this embodiment, the first station may establish the neighbor list, and select the third station (the third station is a non-associated neighboring station of the first station) based on the neighbor list, where the neighbor list includes an AP and a STA that can be directly sensed by the first station (that is, the neighbor list includes a neighboring station of the first station).

Optionally, before the allocating, by the first station to the third station, a time-frequency resource occupied for data transmission between the first station and a second station, the method further includes: acquiring, by the first station, a neighbor list of the second station, where the neighbor list includes a neighboring station of the second station.

In this embodiment, the first station needs to acquire the established neighbor list of the second station, where the neighbor list includes an AP and a STA that can be directly sensed by the second station (the neighbor list includes a neighboring station of the second station). To prevent data transmission performed by the third station on the allocated time-frequency resource from affecting data transmission between the first station and the second station, the first station may learn locations of the second station and the third station based on the neighbor list of the first station and the neighbor list of the second station, so that the first station selects an appropriate third station (the third station is not a neighboring station of the second station), and allocates, to the third station, a time-frequency resource occupied for data transmission between the first station and the second station.

Optionally, a manner in which the first station acquires the neighbor list of the second station may include two implementable manners: passive sensing and active requesting. In the passive sensing manner, the first station may acquire the neighbor list of the second station by passively sensing a frame, such as a beacon frame (Beacon Frame), sent by the second station; correspondingly, the second station may actively send the neighbor list of the second station to the first station periodically or when the neighbor list of the second station changes. In the active requesting manner, the first station may actively send a request frame, and then receive a response frame of the second station to acquire information about the neighbor list of the second station; correspondingly, the second station may send the neighbor list of the second station according to a query sent by the first station.

In this embodiment, a first station successfully reserves a time-frequency resource, and allocates, to a third station, a time-frequency resource occupied for data transmission between the first station and a second station, so that the third station performs data transmission on the allocated time-frequency resource, where the third station is a non-associated neighboring station of the first station, and the third station can share, with the first station, the time-frequency resource reserved by the first station. Therefore, system transmission efficiency is improved.

Figure 7:
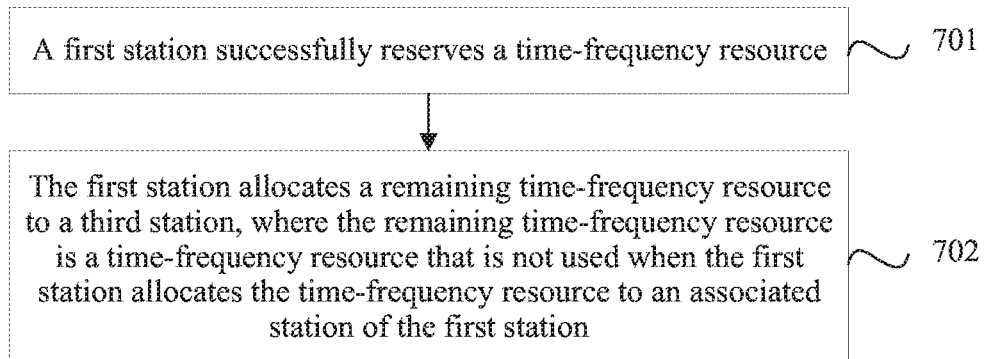
FIG. 7 is a schematic flowchart of Embodiment 3 of a data transmission processing method according to embodiments.

FIG. 7 is a schematic flowchart of Embodiment 3 of a data transmission processing method according to embodiments. As shown in FIG. 7, the method in this embodiment may include the following steps.

Step 701: A first station successfully reserves a time-frequency resource.

Step 702: The first station allocates a remaining time-frequency resource to a third station, where the remaining time-frequency resource is a time-frequency resource that is not used when the first station allocates the time-frequency resource to an associated station of the first station.

Optionally, the allocating, by the first station, a remaining time-frequency resource to the third station includes: sending, by the first station, scheduling signaling to the third station, where the scheduling signaling includes information indicating that the third station can perform data transmission on the remaining time-frequency resource.

A difference between this embodiment and the foregoing embodiment lies in that in the foregoing embodiment, a first station allocates, to a third station, a time-frequency resource occupied for data transmission between the first station and a second station; however, in this embodiment, the first station allocates a remaining time-frequency resource to the third station, where the remaining time-frequency resource is a time-frequency resource that is not used when the first station allocates, to an associated station of the first station, the time-frequency resource reserved by the first station.

In this embodiment, the third station is a non-associated neighboring station of the first station, such as a neighboring AP or a neighboring STA. Further, the third station may perform data transmission on the allocated time-frequency resource. If the third station is an AP, the AP may directly schedule an associated STA of the AP on the allocated time-frequency resource; if the third station is a STA, the STA may notify an associated AP of the STA of a scheduling indication information, so that the associated AP schedules the STA. Optionally, a manner in which the STA notifies the associated AP of the scheduling indication information may be reporting by using a common uplink time-frequency resource, or may be another manner, which is not limited herein in this embodiment.

Optionally, as shown in FIG. 6, the first station may send the scheduling signaling to the third station by using multiple scheduling signaling sending periods set in a downlink period.

Optionally, the scheduling signaling sent by the first station to the third station may be transmitted through an air interface, which is equivalent to that the first station uses the third station as a STA of a BSS to which the first station belongs, to perform resource scheduling.

Optionally, before the allocating, by the first station, a remaining time-frequency resource to a third station, the method further includes: establishing, by the first station, a neighbor list, where the neighbor list includes a neighboring station of the first station.

In this embodiment, the first station may establish a neighbor list, and select the third station (the third station is a non-associated neighboring station of the first station) based on the neighbor list.

In this embodiment, a first station successfully reserves a time-frequency resource, and allocates, to a third station, a time-frequency resource that is not used when the first station allocates the time-frequency resource to an associated station of the first station, so that the third station performs data transmission on the allocated time-frequency resource, where the third station is a non-associated neighboring station of the first station, and the third station can share, with the first station, the time-frequency resource reserved by the first station. Therefore, system transmission efficiency is improved.

Figure 8:
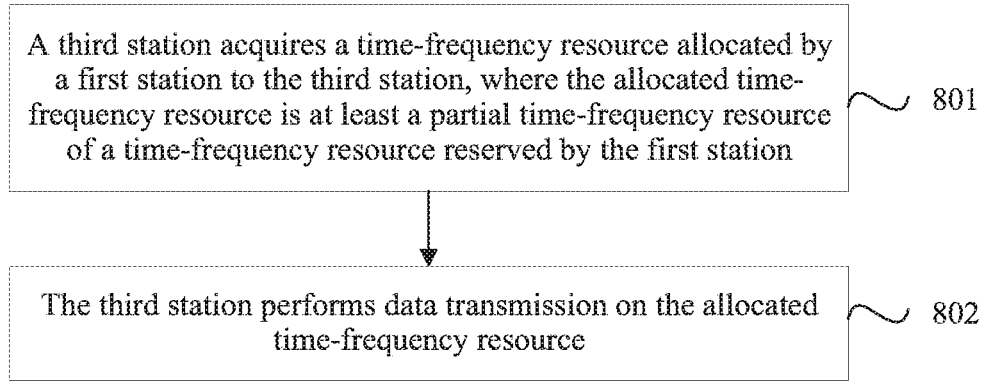
FIG. 8 is a schematic flowchart of Embodiment 4 of a data transmission processing method according to embodiments.

FIG. 8 is a schematic flowchart of Embodiment 4 of a data transmission processing method according to embodiments. As shown in FIG. 8, the method in this embodiment may include the following steps.

Step 801: A third station acquires a time-frequency resource allocated by a first station to the third station, where the allocated time-frequency resource is at least a partial time-frequency resource of a time-frequency resource reserved by the first station, and the third station is a non-associated neighboring station of the first station.

Step 802: The third station performs data transmission on the allocated time-frequency resource.

In this embodiment, the first station may be an AP, and the third station may be a non-associated neighboring AP of the first station, or may be a non-associated STA of the first station. The third station may acquire at least a partial time-frequency resource, allocated by the first station to the third station, of the time-frequency resource reserved by the first station, so that the third station can perform data transmission on the allocated time-frequency resource. Optionally, the allocated time-frequency resource may be a time-frequency resource occupied for data transmission between the first station and a second station (where the second station is an associated station of the first station, and the third station is not a neighboring station of the second station), or may be a remaining time-frequency resource, where the remaining time-frequency resource is a time-frequency resource that is not used when the first station allocates the time-frequency resource to an associated station of the first station.

Optionally, if the allocated time-frequency resource is the time-frequency resource occupied for data transmission between the first station and the second station, the acquiring, by a third station, a time-frequency resource allocated by a first station to the third station includes: receiving, by the third station, scheduling signaling sent by the first station, where the scheduling signaling includes information indicating that the third station can send data on the time-frequency resource occupied for sending, by the first station, data to the second station; or receiving, by the third station, scheduling signaling sent by the first station, where the scheduling signaling includes information indicating that an associated station of the third station can send data on a time-frequency resource occupied for receiving, by the first station, data sent by the second station, and the associated station of the third station is not a neighboring station of the first station.

In this embodiment, the data transmission between the first station and the second station includes two implementable manners, where a first implementable manner is that the first station performs downlink sending, and a second implementable manner is that the second station performs uplink sending.

In this embodiment, a scenario in which two APs are neighboring stations and a scenario in which two APs are not neighboring stations (that is, two BSSs have an overlapped area, but either AP of the two APs is not within coverage of the other AP) are included. In the scenario in which the two APs are neighboring stations, the first station may be correspondingly a first AP, and the third station may be correspondingly a non-associated neighboring AP of the first AP. In the scenario in which the two APs are not neighboring stations, the third station may be correspondingly a non-associated STA of the first AP.

When the first station performs downlink sending (that is, in a downlink period), the third station may acquire, by receiving the scheduling signaling sent by the first station, the time-frequency resource allocated by the first station to the third station, where the scheduling signaling includes information indicating that the third station can send data on the time-frequency resource occupied for sending, by the first station, data to the second station. In this embodiment, a specific process in which the third station acquires the allocated time-frequency resource corresponds to the process shown in FIG. 3 in the foregoing Embodiment 2, and details are not described herein again.

When the second station performs uplink sending (that is, in an uplink period), the third station may acquire, by receiving the scheduling signaling sent by the first station, the time-frequency resource allocated by the first station to the third station, where the scheduling signaling includes information indicating that the associated station of the third station can send data on the time-frequency resource occupied for receiving, by the first station, data sent by the second station (that is, the third station may receive data sent by the associated station), where the associated station of the third station is not a neighboring station of the first station. In the scenario in which the two APs are neighboring stations, the associated station of the third station may be correspondingly an associated STA of the non-associated neighboring AP. In the scenario in which the two APs are not neighboring stations, the associated station of the third station may be correspondingly an associated AP of the non-associated STA. In this embodiment, the third station may directly perform data communication with the associated station of the third station. In this embodiment, a specific process in which the third station acquires the allocated time-frequency resource corresponds to the process shown in FIG. 4 in the foregoing Embodiment 2, and details are not described herein again.

Optionally, if the allocated time-frequency resource is the remaining time-frequency resource, the acquiring, by a third station, a time-frequency resource allocated by a first station to the third station includes: receiving, by the third station, scheduling signaling sent by the first station, where the scheduling signaling includes information indicating that the third station can perform data transmission on the remaining time-frequency resource.

In this embodiment, the third station is a non-associated neighboring station of the first station, such as a neighboring AP or a neighboring STA. Further, the third station may perform data transmission on the allocated time-frequency resource. If the third station is an AP, the AP may directly schedule an associated STA of the AP on the allocated time-frequency resource; if the third station is a STA, the STA may notify an associated AP of the STA of a scheduling indication information, so that the associated AP schedules the STA. Optionally, a manner in which the STA notifies the associated AP of the scheduling indication information may be reporting by using a common uplink time-frequency resource, or may be another manner, which is not limited herein in this embodiment.

Optionally, if the third station is a neighboring station of the first station in a scenario in which two access points APs are not neighboring stations, where the first station is either one of the two APs, after the receiving, by the third station, scheduling signaling sent by the first station, the method further includes: notifying, by the third station, the associated station of the third station of the indication information in the scheduling signaling, so that the associated station performs scheduling according to the indication information; and receiving, by the third station, scheduling performed by the associated station of the third station. Optionally, the third station receives, in multiple scheduling signaling sending periods set in a downlink period, the scheduling performed by the associated station of the third station.

Optionally, the receiving, by the third station, scheduling signaling sent by the first station includes: receiving, by the third station, scheduling signaling that is sent by the first station by using multiple scheduling signaling sending periods set in a downlink period.

Optionally, the third station may further receive scheduling signaling that is sent by the first station through an air interface, which is equivalent to that the first station uses the third station as a STA of a BSS to which the first station belongs, to perform resource scheduling.

In this embodiment, a third station acquires at least a partial time-frequency resource, allocated by a first station to the third station, of a time-frequency resource reserved by the first station, so that the third station performs data transmission on the allocated time-frequency resource, where the third station is a non-associated neighboring station of the first station, and the third station can share, with the first station, the time-frequency resource reserved by the first station. Therefore, system transmission efficiency is improved.

Figure 9:
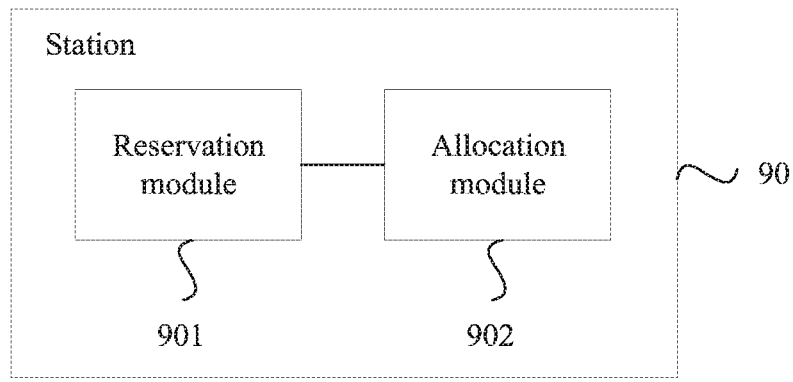
FIG. 9 is a schematic structural diagram of Embodiment 1 of a station according to embodiments.

FIG. 9 is a schematic structural diagram of Embodiment 1 of a station according to embodiments. The station in this embodiment may be a first station. As shown in FIG. 9, a station 90 provided in this embodiment includes a reservation module 901 and an allocation module 902.

The reservation module 901 is configured to successfully reserve a time-frequency resource.

The allocation module 902 is configured to allocate at least a partial time-frequency resource of the time-frequency resource to a third station, so that the third station performs data transmission on the allocated time-frequency resource, where the third station is a non-associated neighboring station of the first station.

Optionally, the allocation module 902 includes: a first allocation unit, configured to allocate, to the third station, a time-frequency resource occupied for data transmission between the first station and a second station, where the second station is an associated station of the first station, and the third station is not a neighboring station of the second station; or a second allocation unit, configured to allocate a remaining time-frequency resource to the third station, where the remaining time-frequency resource is a time-frequency resource that is not used when the first station allocates the time-frequency resource to an associated station of the first station.

Optionally, the first allocation unit is specifically configured to: send scheduling signaling to the third station, where the scheduling signaling includes information indicating that the third station can send data on the time-frequency resource occupied for sending, by the first station, data to the second station; or send scheduling signaling to the third station, where the scheduling signaling includes information indicating that an associated station of the third station can send data on a time-frequency resource occupied for receiving, by the first station, data sent by the second station, and the associated station of the third station is not a neighboring station of the first station.

Optionally, the second allocation unit is specifically configured to send scheduling signaling to the third station, where the scheduling signaling includes information indicating that the third station can perform data transmission on the remaining time-frequency resource.

Optionally, the allocation module 902 is specifically configured to send the scheduling signaling to the third station by using multiple scheduling signaling sending periods set in a downlink period.

Optionally, the station further includes: an establishment module, configured to establish a neighbor list, where the neighbor list includes a neighboring station of the first station.

Optionally, if the allocation module 902 includes the first allocation unit, the station further includes: an acquiring module, configured to acquire a neighbor list of the second station, where the neighbor list includes a neighboring station of the second station.

The station in this embodiment may be configured to perform the technical solutions in Embodiment 1 to Embodiment 3 of the data transmission processing method; implementation principles and technical effects thereof are similar, and details are not described herein again.

Figure 10:
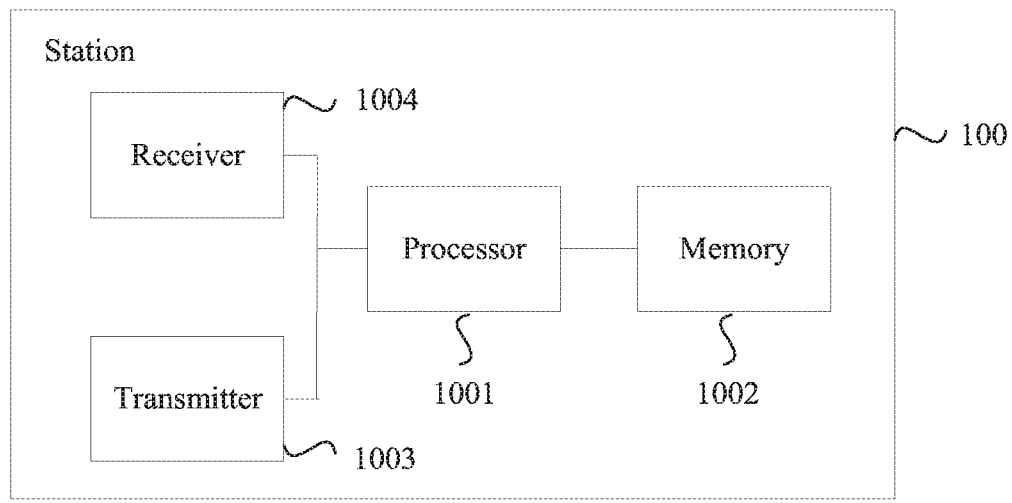
FIG. 10 is a schematic structural diagram of Embodiment 2 of a station according to embodiments.

FIG. 10 is a schematic structural diagram of Embodiment 2 of a station according to embodiments. The station in this embodiment may be a first station. As shown in FIG. 10, a station 100 provided in this embodiment includes a processor 1001 and a memory 1002. The station 100 may further include a transmitter 1003 and a receiver 1004. The transmitter 1003 and the receiver 1004 may be connected to the processor 1001. The transmitter 1003 is configured to send data or information, the receiver 1004 is configured to receive data or information, and the memory 1002 is configured to store an execution instruction. When the station 100 runs, the processor 1001 communicates with the memory 1002, and the processor 1001 invokes the execution instruction in the memory 1002, so as to execute operations in Embodiment 1 to Embodiment 3 of the foregoing data transmission processing method.

The station in this embodiment may be configured to execute the technical solutions of the data transmission processing method that is executed by the first station in the foregoing embodiments; implementation principles and technical effects thereof are similar, and details are not described herein again.

Figure 11:
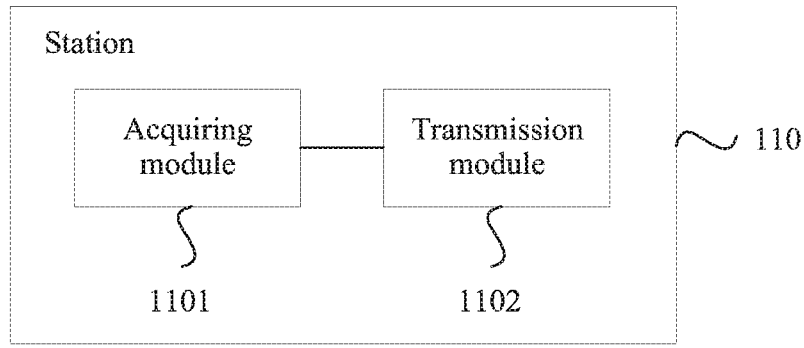
FIG. 11 is a schematic structural diagram of Embodiment 3 of a station according to embodiments.

FIG. 11 is a schematic structural diagram of Embodiment 3 of a station according to embodiments. The station in this embodiment may be a third station. As shown in FIG. 11, a station 110 provided in this embodiment includes an acquiring module 1101 and a transmission module 1102.

The acquiring module 1101 is configured to acquire a time-frequency resource allocated by a first station to the third station, where the allocated time-frequency resource is at least a partial time-frequency resource of a time-frequency resource reserved by the first station, and the third station is a non-associated neighboring station of the first station.

The transmission module 1102 is configured to perform data transmission on the allocated time-frequency resource.

Optionally, that the allocated time-frequency resource is at least a partial time-frequency resource of a time-frequency resource reserved by the first station includes: the allocated time-frequency resource is a time-frequency resource occupied for data transmission between the first station and a second station, where the second station is an associated station of the first station, and the third station is not a neighboring station of the second station; or the allocated time-frequency resource is a remaining time-frequency resource, where the remaining time-frequency resource is a time-frequency resource that is not used when the first station allocates the time-frequency resource to an associated station of the first station.

Optionally, when the allocated time-frequency resource is the time-frequency resource occupied for data transmission between the first station and the second station, the acquiring module 1101 is specifically configured to: receive scheduling signaling sent by the first station, where the scheduling signaling includes information indicating that the third station can send data on the time-frequency resource occupied for sending, by the first station, data to the second station; or receive scheduling signaling sent by the first station, where the scheduling signaling includes information indicating that an associated station of the third station can send data on a time-frequency resource occupied for receiving, by the first station, data sent by the second station, and the associated station of the third station is not a neighboring station of the first station.

Optionally, when the allocated time-frequency resource is the remaining time-frequency resource, the acquiring module 1101 is specifically configured to receive scheduling signaling sent by the first station, where the scheduling signaling includes information indicating that the third station can perform data transmission on the remaining time-frequency resource.

Optionally, the acquiring module 1101 is specifically configured to receive the scheduling signaling that is sent by the first station by using multiple scheduling signaling sending periods set in a downlink period.

Optionally, if the third station is a neighboring station of the first station in a scenario in which two access points APs are not neighboring stations, where the first station is either one of the two APs, the third station further includes: a notification module, configured to notify the associated station of the third station of indication information in the scheduling signaling; and a receiving module, configured to receive scheduling performed by the associated station of the third station.

Optionally, the receiving module is specifically configured to receive, by using the multiple scheduling signaling sending periods set in the downlink period, the scheduling performed by the associated station of the third station.

The station in this embodiment may be configured to perform the technical solutions in Embodiment 4 of the data transmission processing method; implementation principles and technical effects thereof are similar, and details are not described herein again.

Figure 12:
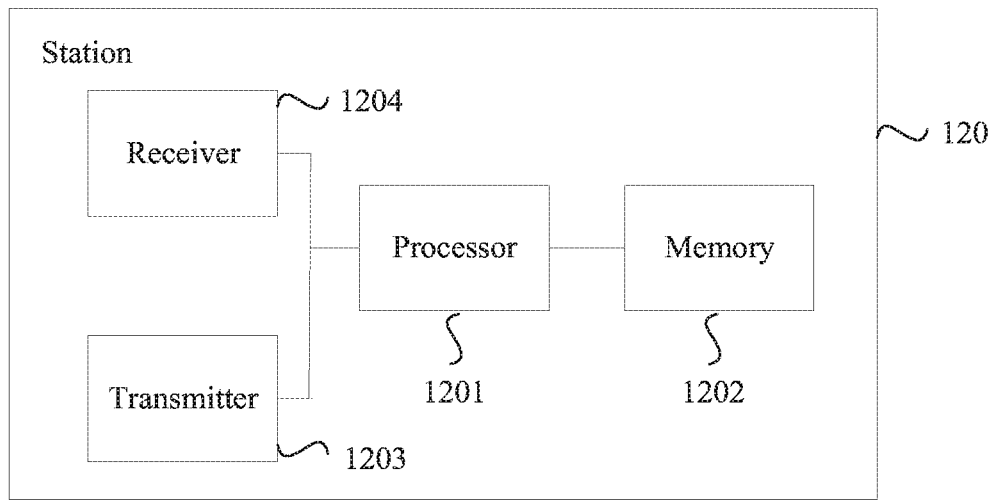
FIG. 12 is a schematic structural diagram of Embodiment 4 of a station according to embodiments.

FIG. 12 is a schematic structural diagram of Embodiment 4 of a station according to embodiments. The station in this embodiment may be a third station. As shown in FIG. 12, a station 120 provided in this embodiment includes a processor 1201 and a memory 1202. The station 120 may further include a transmitter 1203 and a receiver 1204. The transmitter 1203 and the receiver 1204 may be connected to the processor 1201. The transmitter 1203 is configured to send data or information, the receiver 1204 is configured to receive data or information, and the memory 1202 is configured to store an execution instruction. When the station 120 runs, the processor 1201 communicates with the memory 1202, and the processor 1201 invokes the execution instruction in the memory 1202, so as to execute operations in Embodiment 4 of the foregoing data transmission processing method.

The station in this embodiment may be configured to execute the technical solutions of the data transmission processing method that is executed by the third station in the foregoing embodiments of the present invention; implementation principles and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A method, comprising:
reserving, by a first station, a first time-frequency resource to perform data transmission with an associated station of the first station; and
allocating, by the first station, a second time-frequency resource of the first time-frequency resource to a third station for the third station to perform data transmission on the second time-frequency resource, wherein the second time-frequency resource is at least a partial time-frequency resource of the first time-frequency resource, wherein the third station is a non-associated neighboring station of the first station, wherein allocating, by the first station, the second time-frequency resource of the first time-frequency resource to the third station comprises allocating, to the third station, a time-frequency resource occupied for data transmission between the first station and a second station, the second station being an associated station of the first station.

2. The method according to claim 1, wherein allocating, by the first station, the second time-frequency resource of the first time-frequency resource to the third station further comprises allocating, to the third station, a remaining time-frequency resource, the remaining time-frequency resource being an unused time-frequency resource remaining from the first time-frequency resource according to an allocation by the first station of the first time-frequency resource to an associated station of the first station.

3. The method according to claim 1, wherein allocating, by the first station to the third station, the time-frequency resource occupied for data transmission between the first station and the second station comprises:
sending, by the first station to the third station, scheduling signaling, the scheduling signaling comprising information indicating that the third station can send data on the time-frequency resource occupied for sending by the first station to the second station; or
sending, by the first station to the third station, scheduling signaling, the scheduling signaling comprising information indicating that an associated station of the third station can send data on a time-frequency resource occupied for receiving, by the first station, data sent by the second station.

4. The method according to claim 3, wherein sending, by the first station to the third station, scheduling signaling comprises sending, by the first station, the scheduling signaling to the third station using multiple scheduling signaling sending periods set in a downlink period.

5. The method according to claim 2, wherein allocating, by the first station, the remaining time-frequency resource to the third station comprises sending, by the first station to the third station, scheduling signaling, the scheduling signaling comprising information indicating that the third station can perform data transmission on the remaining time-frequency resource.

6. The method according to claim 1, further comprising:
acquiring, by the first station, a neighbor list of the second station, the neighbor list including one or more neighboring stations of the second station; and
selecting, by the first station according to the neighbor list of the second station and a neighbor list of the first station, the third station for allocation of the second time-frequency resource such that the third station is not a neighboring station of the second station.

7. A method, comprising:
acquiring, by a third station, a second time-frequency resource, the second time-frequency resource allocated to the third station by a first station, the second time-frequency resource being at least a partial time-frequency resource of a first time-frequency resource reserved by the first station to perform data transmission with an associated station of the first station, the third station being a non-associated neighboring station of the first station, wherein the second time-frequency resource comprises a time-frequency resource occupied for data transmission between the first station and a second station, the second station being an associated station of the first station; and
performing, by the third station, data transmission on the second time-frequency resource.

8. The method according to claim 7, wherein the second time-frequency resource comprises a remaining time-frequency resource, the remaining time-frequency resource being an unused time-frequency resource remaining from the first time-frequency resource according to an allocation by the first station of the first time-frequency resource to an associated station of the first station.

9. The method according to claim 7, wherein acquiring, by the third station, the second time-frequency resource allocated by the first station to the third station, the second time-frequency resource being a time-frequency resource occupied for data transmission between the first station and the second station comprises:

receiving, by the third station, scheduling signaling sent by the first station, the scheduling signaling comprising information indicating that the third station can send data on the time-frequency resource occupied for sending by the first station to the second station; or receiving, by the third station, scheduling signaling sent by the first station, the scheduling signaling comprising information indicating that an associated station of the third station can send data on a time-frequency resource occupied for receiving, by the first station, data sent by the second station.

10. The method according to claim 9, further comprising, in response to the third station being a neighboring station of the first station and two access points (APs) not being neighboring stations, the first station being an AP of the two APs, after receiving, by the third station, scheduling signaling sent by the first station:

notifying, by the third station, the associated station of the third station of indication information in the scheduling signaling; and receiving, by the third station, scheduling performed by the associated station of the third station.

11. The method according to claim 8, wherein acquiring, by the third station, the second time-frequency resource allocated by the first station to the third station, the second time-frequency resource being a remaining time-frequency resource comprises receiving, by the third station, scheduling signaling sent by the first station, the scheduling signaling comprising information indicating that the third station can perform data transmission on the remaining time-frequency resource.

12. A communication apparatus, comprising:
a processor;
a non-transitory computer-readable storage medium storing a program for execution by the processor, the program including instructions to:
reserve a first time-frequency resource to perform data transmission with an associated station of the communication apparatus; and
allocate a second time-frequency resource of the first time-frequency resource to a third station for the third station to perform data transmission on the second time-frequency resource, wherein the second time-frequency resource is at least a partial time-frequency resource of the first time-frequency resource, wherein the third station is a non-associated neighboring station of the communication apparatus, wherein, to allocate the second time-frequency resource to the third station, the instructions comprise instructions to allocate, to the third station, a time-frequency resource occupied for data transmission between the communication apparatus and a second station, the second station being an associated station of the communication apparatus.

13. The communication apparatus according to claim 12, wherein, to allocate the second time-frequency resource to the third station, the instructions further comprise instructions to allocate, to the third station, a remaining time-frequency resource, the remaining time-frequency resource being an unused time-frequency resource remaining from the first time-frequency resource according to an allocation by the communication apparatus of the first time-frequency resource to an associated station of the communication apparatus.

14. The communication apparatus according to claim 12, wherein, to allocate, to the third station, the time-frequency resource occupied for data transmission between the communication apparatus and the second station, the instructions comprise instructions to:

send scheduling signaling to the third station, the scheduling signaling comprising information indicating that the third station can send data on the time-frequency resource occupied for sending by the communication apparatus to the second station; or send scheduling signaling to the third station, the scheduling signaling comprising information indicating that an associated station of the third station can send data on a time-frequency resource occupied for receiving, by the communication apparatus, data sent by the second station.

15. The communication apparatus according to claim 14, wherein the instructions further comprise instructions to send the scheduling signaling to the third station using multiple scheduling signaling sending periods set in a downlink period.

16. The communication apparatus according to claim 13, wherein the instructions further comprise instructions to send scheduling signaling to the third station, the scheduling signaling comprising information indicating that the third station can perform data transmission on the remaining time-frequency resource.

17. A communication apparatus, comprising:
a processor;
a non-transitory computer-readable storage medium storing a program for execution by the processor, the program including instructions to:
acquire a second time-frequency resource allocated to the communication apparatus by a first station, the second time-frequency resource being at least a partial time-frequency resource of a first time-frequency resource reserved by the first station to perform data transmission with an associated station of the first station, the communication apparatus being a non-associated neighboring station of the first station, wherein the second time-frequency resource comprises a time-frequency resource occupied for data transmission between the first station and a second station, the second station being an associated station of the first station; and
perform data transmission on the second time-frequency resource.

18. The communication apparatus according to claim 17, wherein the second time-frequency resource comprises a remaining time-frequency resource, the remaining time-frequency resource being an unused time-frequency resource remaining from the first time-frequency resource according to an allocation by the first station of the first time-frequency resource to an associated station of the first station.

19. The communication apparatus according to claim 17, wherein the instructions further comprise instructions to:
receive scheduling signaling sent by the first station, the scheduling signaling comprising information indicating that the communication apparatus can send data on the time-frequency resource occupied for sending by the first station to the second station; or
receive scheduling signaling sent by the first station, the scheduling signaling comprising information indicating that an associated station of the communication apparatus can send data on a time-frequency resource occupied for receiving, by the first station, data sent by the second station.

20. The communication apparatus according to claim 19, wherein the instructions further comprise instructions to, in response to the communication apparatus being a neighboring station of the first station and two access points (APs) not being neighboring stations, the first station being an AP of the two APs, after receiving scheduling signaling sent by the first station:
   notify the associated station of the communication apparatus of indication information in the scheduling signaling; and
   receive scheduling performed by the associated station of the communication apparatus.

* * * * *